(12) United States Patent
Hayakawa (10) Patent No.: US 9,233,717 B2
(45) Date of Patent: Jan. 12, 2016

(54) VEHICLE SIDE SECTION STRUCTURE

(71) Applicant: Tatsuya Hayakawa, Toyota (JP)

(72) Inventor: Tatsuya Hayakawa, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 14/378,497

(22) PCT Filed: Jan. 29, 2013

(86) PCT No.: PCT/IB2013/000098
§ 371 (c)(1),
(2) Date: Aug. 13, 2014

(87) PCT Pub. No.: WO2013/121258
PCT Pub. Date: Aug. 22, 2013

(65) Prior Publication Data
US 2015/0021954 A1    Jan. 22, 2015

(30) Foreign Application Priority Data

Feb. 15, 2012  (JP) .................................. 2012-031037

(51) Int. Cl.
*B62D 25/02*     (2006.01)
*B62D 25/04*     (2006.01)
(Continued)

(52) U.S. Cl.
CPC .............. *B62D 25/025* (2013.01); *B62D 25/04* (2013.01); *B62D 25/2036* (2013.01); *B62D 27/023* (2013.01)

(58) Field of Classification Search
CPC .... B62D 21/157; B62D 25/02; B62D 25/025; B62D 25/20; B62D 25/2036; B62D 25/04

USPC ............. 296/187.08, 187.12, 193.05–193.07, 296/203.03, 204, 205, 209, 29, 30
See application file for complete search history.

(56) References Cited

U.S. PATENT DOCUMENTS 6,053,564 A * 4/2000 Kamata et al. ........... 296/187.09
8,720,985 B2 * 5/2014 Izumi et al. ................... 296/209
2009/0146457 A1 6/2009 Kanagai et al.
(Continued)

FOREIGN PATENT DOCUMENTS

EP    2 030 872      3/2009
JP    49-058011 U1   8/1972
(Continued)

OTHER PUBLICATIONS

International Search Report Issued Apr. 19, 2013 in PCT/IB13/000098 Filed Jan. 29, 2013.
(Continued)

*Primary Examiner* — Gregory Blankenship
(74) *Attorney, Agent, or Firm* — Oblon, McClelland, Maier & Neustadt, L.L.P.

(57) ABSTRACT

A bulkhead includes three flange portions. A first flange portion of the bulkhead is sandwiched between an upper flange portion of a rocker inner panel and an upper flange portion of a rocker outer panel, so as to be fixed to the rocker inner panel and the rocker outer panel. A third flange portion of the bulkhead extends from the first flange portion to bring at least a part of the third flange portion in contact with an inner surface of the rocker inner panel or an inner surface of the rocker outer panel, and is fixed to the contacted inner surface.

10 Claims, 6 Drawing Sheets (51) Int. Cl.
*B62D 25/20* (2006.01)
*B62D 27/02* (2006.01)

(56) References Cited

U.S. PATENT DOCUMENTS

| | | | |
|---|---|---|---|
| 2010/0109385 A1* | 5/2010 | Yamada et al. | 296/209 |
| 2013/0049408 A1* | 2/2013 | Kurogi et al. | 296/209 |
| 2013/0207418 A1* | 8/2013 | Suzaki et al. | 296/209 |
| 2015/0021954 A1* | 1/2015 | Hayakawa | 296/187.12 |

FOREIGN PATENT DOCUMENTS

| | | |
|---|---|---|
| JP | 60-24672 U | 2/1985 |
| JP | 05-092063 U1 | 12/1993 |
| JP | 11 78978 | 3/1999 |
| JP | 2006 224702 | 8/2006 |
| JP | 2006 273296 | 10/2006 |
| JP | 2007 283794 | 11/2007 |
| JP | 2008 296600 | 12/2008 |
| JP | 2009-113766 | 5/2009 |
| JP | 2009 161056 | 7/2009 |
| JP | 2010-208395 A | 9/2010 |

OTHER PUBLICATIONS

Japanese Office Action issued Mar. 24, 2015 in Patent Application No. 2012-031037 (Partial English Translation only).

* cited by examiner

VEHICLE SIDE SECTION STRUCTURE

BACKGROUND OF THE INVENTION

1. Field of the Invention

The present invention relates to a vehicle side section structure.

2. Description of Related Art

In Japanese Patent Application Publication No. 2008-296600 (JP 2008-296600 A), the following rocker is disclosed. The rocker has a closed cross section constituted by a rocker inner panel and a rocker outer panel, and extends in a vehicle longitudinal direction along a lower edge portion of a vehicle side surface. Additionally, in this related art, a plurality of longitudinal-wall-shaped longitudinal bulkheads, which partition the closed cross section inside of the rocker in the vehicle longitudinal direction, are disposed in the vehicle longitudinal direction at intervals. This suppresses cross-sectional collapse of the rocker.

However, in above-described JP 2008-296600 A, when a load is input to a vehicle upper side with respect to the rocker, the closed cross section of the rocker may be deformed into a parallelogram shape. In this respect, there is a room for improvement.

Other related techniques are disclosed in Japanese Patent Application Publication Nos. 2009-161056 (JP 2009-161056 A), 2006-273296 (JP 2006-273296 A), 2006-224702 (JP 2006-224702 A), and 2007-283794 (JP 2007-283794 A).

SUMMARY OF THE INVENTION

The present invention provides a vehicle side section structure that allows suppressing deformation of a closed cross section of a rocker due to a load input to a vehicle upper side with respect to the rocker.

First aspect of the present invention relates to a vehicle side section structure. The vehicle side section structure includes a rocker and a bulkhead. The rocker includes a rocker outer panel and a rocker inner panel. The rocker outer panel and the rocker inner panel each have a hat-shaped cross section. The rocker forms a closed cross section with an opening of the rocker outer panel and an opening of the rocker inner panel facing one another. The closed cross section is formed by fixing an upper flange portion of the rocker outer panel and an upper flange portion of the rocker inner panel together and by fixing a lower flange portion of the rocker outer panel and a lower flange portion of the rocker inner panel together. The rocker extends in a vehicle longitudinal direction along a lower edge portion of a vehicle side section. The bulkhead is disposed inside of the rocker. The bulkhead includes a first flange portion, a second flange portion, and a third flange portion. The first flange portion is sandwiched between the upper flange portion of the rocker inner panel and the upper flange portion of the rocker outer panel and fixed to the upper flange portion of the rocker inner panel and the upper flange portion of the rocker outer panel. The second flange portion downwardly extends from the first flange portion. The third flange portion extends from the first flange portion and is fixed to the contacted inner surface such that at least a part of the third flange portion contacts with an inner surface of the rocker inner panel or an inner surface of the rocker outer panel.

In the above-described vehicle side section structure, the third flange portion of the bulkhead is fixed to the inner surface of the rocker inner panel or the inner surface of the rocker outer panel, and the first flange portion is sandwiched and fixed between the upper flange portion of the rocker inner panel and the upper flange portion of the rocker outer panel. This suppresses rotation of the bulkhead around the vehicle longitudinal direction as the axial direction. As a result, deformation of the closed cross section of the rocker is effectively suppressed.

Especially, the deformation of the closed cross section of the rocker into a parallelogram shape, which is caused by the load input to the vehicle upper side with respect to the rocker, (deformation into a parallelogram shape in the case where the shape of the closed cross section of the rocker is assumed to be a rectangular shape or approximated to a rectangular shape) is effectively suppressed by the bulkhead provided inside of the rocker.

The first flange portion is coupled to the second flange portion and the third flange portion. These three members are integrally constituted. This consequently reduces stress concentration on the base portion of the first flange portion, and prevents breaking of the base portion of the first flange portion and similar trouble due to the stress concentration.

As described above, the first flange portion of the bulkhead is sandwiched and fixed between the upper flange portion of the rocker inner panel and the upper flange portion of the rocker outer panel. This suppresses the deformation of the closed cross section of the rocker into a parallelogram shape. Additionally, the second flange portion and the third flange portion are coupled to the first flange portion. These three members are integrally constituted to reduce stress concentration on the base portion of the first flange portion. With these configurations, the deformation of the closed cross section of the rocker is effectively suppressed.

The above-described vehicle, side section structure can effectively suppress the deformation of the closed cross section of the rocker compared with a configuration to which the present invention is not applied.

In the above-described vehicle side section structure, the bulkhead may include a longitudinal wall portion that extends in a direction to intersect with the second flange portion and the third flange portion. The longitudinal wall portion may be disposed such that the vehicle longitudinal direction coincides with a thickness direction of the longitudinal wall portion. The first flange portion may be welded to the upper flange portion of the rocker inner panel and the upper flange portion of the rocker outer panel at an extended line of an edge line in a corner portion or at a proximity of the extended line. The corner portion may be formed between the second flange portion and the longitudinal wall portion.

In this vehicle side section structure, the first flange portion is welded to the upper flange portion of the rocker inner panel and the upper flange portion of the rocker outer panel at an extended line or at a proximity of the extended line of an edge line in a corner portion formed between the second flange portion and the longitudinal wall portion. Accordingly, this effectively reduces stress concentration on the base portion of the first flange portion, and more surely prevents breaking of the first flange portion and similar trouble due to the stress concentration.

This vehicle side section structure effectively allows reducing stress concentration on the base portion of the first flange portion compared with the configuration where the first flange portion is welded in a position apart from the extended line of the edge line in the corner portion formed by the second flange portion and the longitudinal wall portion.

In the above-described vehicle side section structure, an upper wall portion of the third flange portion may be disposed to form the closed cross section with a gap between the upper wall portion of the third flange portion and an upper wall portion of the rocker inner panel. A reinforcing member that extends in the vehicle longitudinal direction may be disposed inside of the closed cross section. The closed cross section may be formed by the upper wall portion of the third flange portion and the rocker inner panel.

With this vehicle side section structure, the reinforcing member that extends in the vehicle longitudinal direction may be disposed inside of the closed cross section that is formed by the upper wall portion of the third flange portion and the rocker inner panel. This allows disposing the reinforcing member inside of the rocker along the vehicle longitudinal direction without dividing the reinforcing member in front and rear of the bulkhead.

With this vehicle side section structure, the rocker is reinforced more strongly than the configuration where the reinforcing member is divided in front and rear of the bulkhead.

In the above-described vehicle side section structure, the bulkheads may be paired and spaced in the vehicle longitudinal direction inside of the rocker. The paired bulkheads may include the first flange portions coupled and integrated with one another and the second flange portions coupled and integrated with one another.

In this vehicle side section structure, the first flange portions are coupled and integrated with one another, and the second flange portions are coupled and integrated with one another in the paired bulkheads. This improves rigidity, and the rotation of the bulkhead around the vehicle longitudinal direction as the axial direction is further suppressed. Accordingly, the deformation of the closed cross section of the rocker is more effectively suppressed.

This vehicle side section structure allows more effectively reducing the deformation of the closed cross section of the rocker compared with the configuration where the paired bulkheads are not integrated.

Second aspect of the present invention relates to a vehicle side section structure. The vehicle side section structure includes a rocker and a bulkhead. The rocker includes a rocker outer panel and a rocker inner panel. The rocker outer panel and the rocker inner panel each have a hat-shaped cross section. The rocker forms a closed cross section with an opening of the rocker outer panel and an opening of the rocker inner panel facing one another. The closed cross section is formed by fixing an upper flange portion of the rocker outer panel and an upper flange portion of the rocker inner panel together and by fixing a lower flange portion of the rocker outer panel and a lower flange portion of the rocker inner panel together. The rocker extends in a vehicle longitudinal direction along a lower edge portion of a vehicle side section. The bulkhead is disposed inside of the rocker. The bulkhead includes a first flange portion, a second flange portion, and two third flange portions. The first flange portion is sandwiched between the upper flange portion of the rocker inner panel and the upper flange portion of the rocker outer panel and is fixed to the upper flange portion of the rocker inner panel and the upper flange portion of the rocker outer panel. The second flange portion downwardly extends from the first flange portion. The two third flange portion is spaced in the vehicle longitudinal direction. The two third flange portion extends from the first flange portion and is fixed to a contacted inner surface such that at least a part of the third flange portion contacts with an inner surface of the rocker inner panel or an inner surface of the rocker outer panel.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 5A and 5B are explanatory diagrams schematically illustrating a state where the closed cross section of the rocker is deformed into a parallelogram shape.

DETAILED DESCRIPTION OF EMBODIMENTS

A description will be given of a vehicle side section structure according to an embodiment of the present invention using FIG. 1 to FIG. 6. An arrow FR in the drawings indicates a vehicle forward side, an arrow UP indicates a vehicle upper side, and an arrow OUT indicates an outer side in a vehicle width direction. "× mark" in the drawings indicates a welding point of spot welding.

Figure 1:
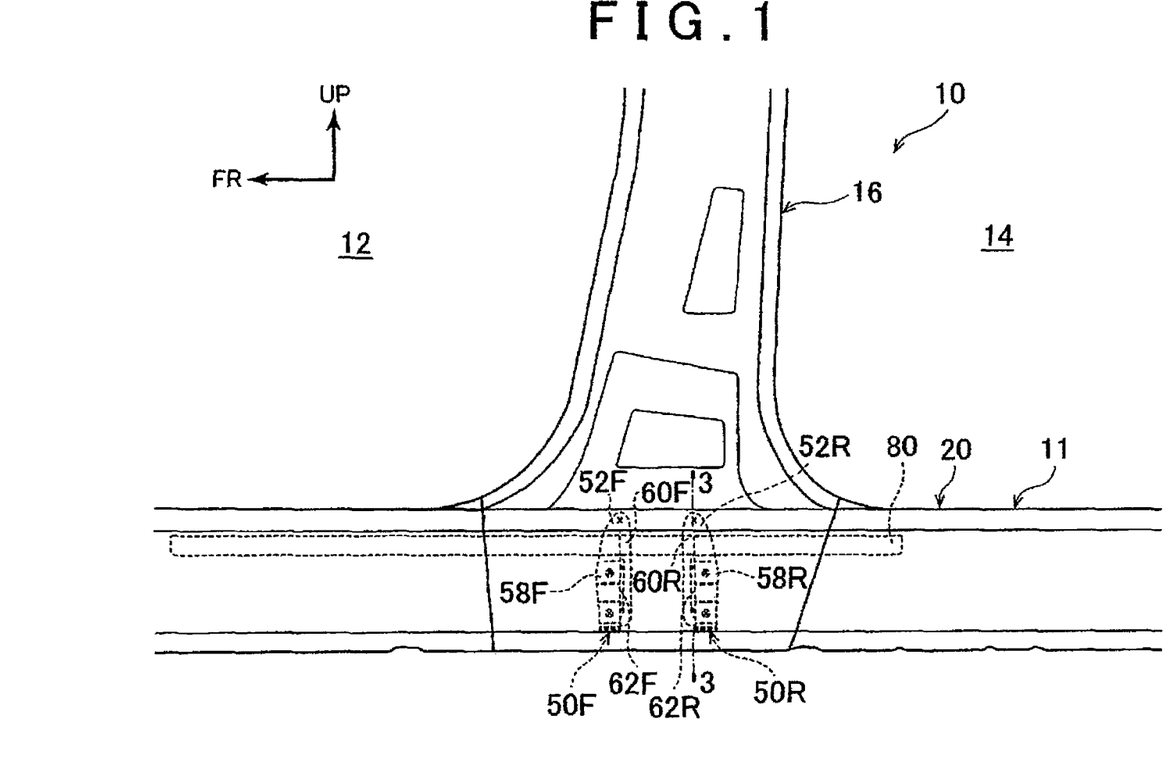
FIG. 1 is a side view, viewed from an outer side in a vehicle width direction, of a vehicle side section to which a vehicle side section structure according to this embodiment is applied.

As illustrated in FIG. 1, at a vehicle forward side of a vehicle side section 10, a front door opening portion 12 that is opened and closed by a front side door (not shown) is formed. Similarly, at a vehicle rear side of the vehicle side section 10, a rear door opening portion 14 that is opened and closed by a rear side door (not shown) is formed.

Between the front door opening portion 12 and the rear door opening portion 14 in the vehicle side section 10 (an intermediate portion in a vehicle longitudinal direction), a center pillar 16 with a closed cross-sectional structure is disposed such that a vehicle up-down direction approximately coincides with a longitudinal direction. In a lower edge portion (a lower side of the front side door and the rear side door) of the front door opening portion 12 and the rear door opening portion 14 in the vehicle side section 10, that is, in a lower edge portion 11 of the vehicle side section 10, a rocker 20 with a closed cross-sectional structure, which is disposed such that the vehicle longitudinal direction coincides with the longitudinal direction, is provided.

Figure 3:
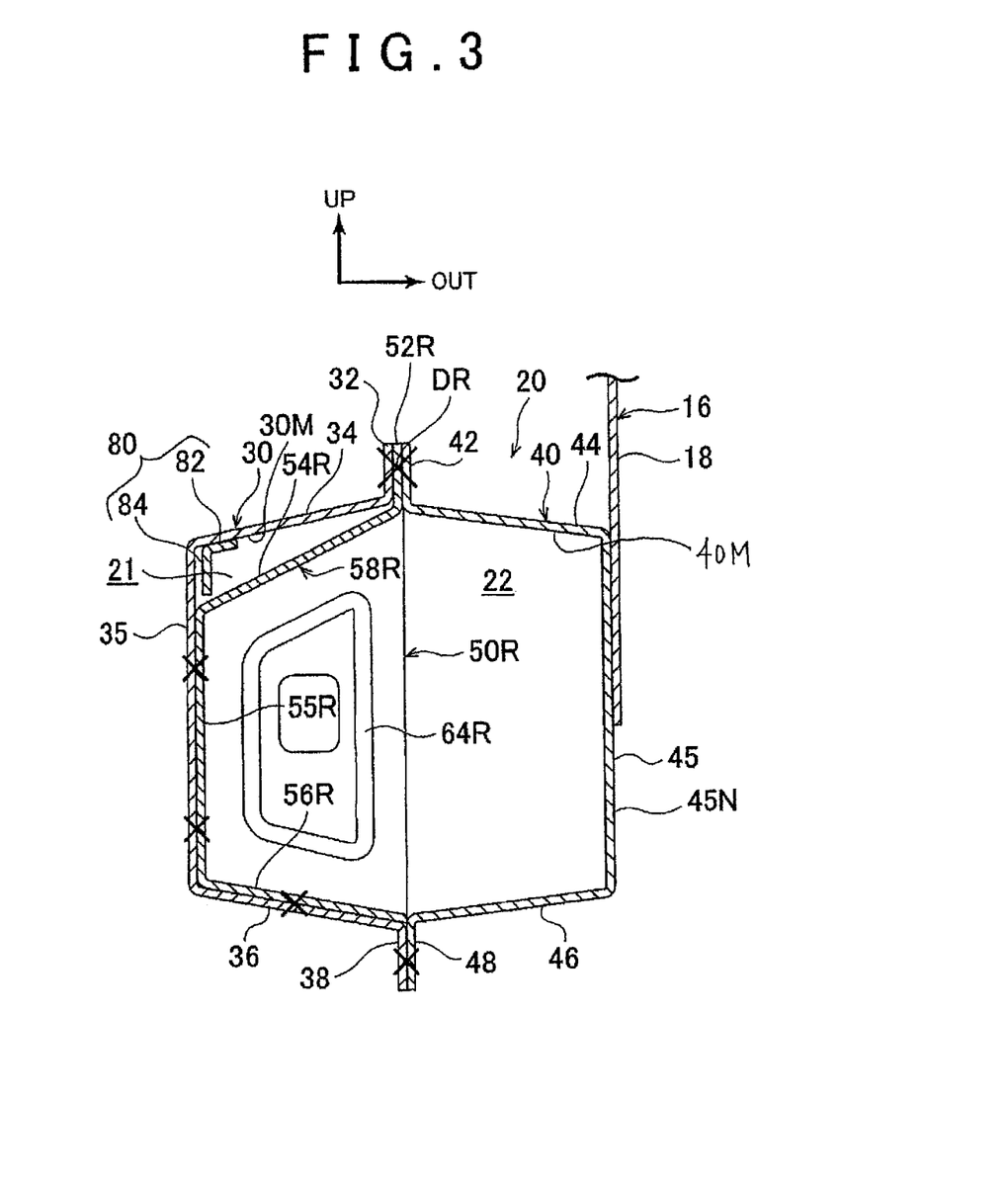
FIG. 3 is a cross-sectional view taken along the line 3-3 in FIG. 1.

As illustrated in FIG. 3, the rocker 20 includes a rocker inner panel 30 and a rocker outer panel 40. The rocker inner panel 30 is disposed at an inner side in a vehicle width direction, and has a hat-shaped cross section with an opening side toward the outer side in the vehicle width direction. The rocker outer panel 40 is disposed at the outer side in the vehicle width direction of the rocker inner panel 30, and has a hat-shaped cross section with an opening side toward the inner side in the vehicle width direction.

The rocker inner panel 30 forms approximately a hat-shaped cross section with an upper wall portion 34, a sidewall portion 35, and a lower wall portion 36. From a distal end of the upper wall portion 34, an upper flange portion 32 is extended toward the vehicle upper side. From a distal end of the lower wall portion 36, a lower flange portion 38 is extended toward a vehicle lower side. Similarly, the rocker outer panel 40 forms approximately a hat-shaped cross section with an upper wall portion 44, a sidewall portion 45, and a lower wall portion 46. From a distal end of the upper wall portion 44, an upper flange portion 42 is extended toward the vehicle upper side. From a distal end of the lower wall portion 46, a lower flange portion 48 is extended toward the vehicle lower side.

The upper flange portion 32 and the lower flange portion 38 of the rocker inner panel 30 are respectively overlapped and spot welded to the upper flange portion 42 and the lower flange portion 48 of the rocker outer panel 40. This constitutes the rocker 20 with a closed cross section 22 formed inside. Accurately, between the upper flange portion 32 of the rocker inner panel 30 and the upper flange portion 42 of the rocker outer panel 40, first flange portions 52F and 52R of respective bulkheads 50F and 50R described below are spot welded in a state where the first flange portions 52F and 52R are sandwiched.

A lower end portion of a center pillar outer panel 18 that constitutes the outer side in the vehicle width direction of the center pillar 16 is fixed to an outer surface 45N of the sidewall portion 45 of the rocker outer panel 40.

Figure 2:
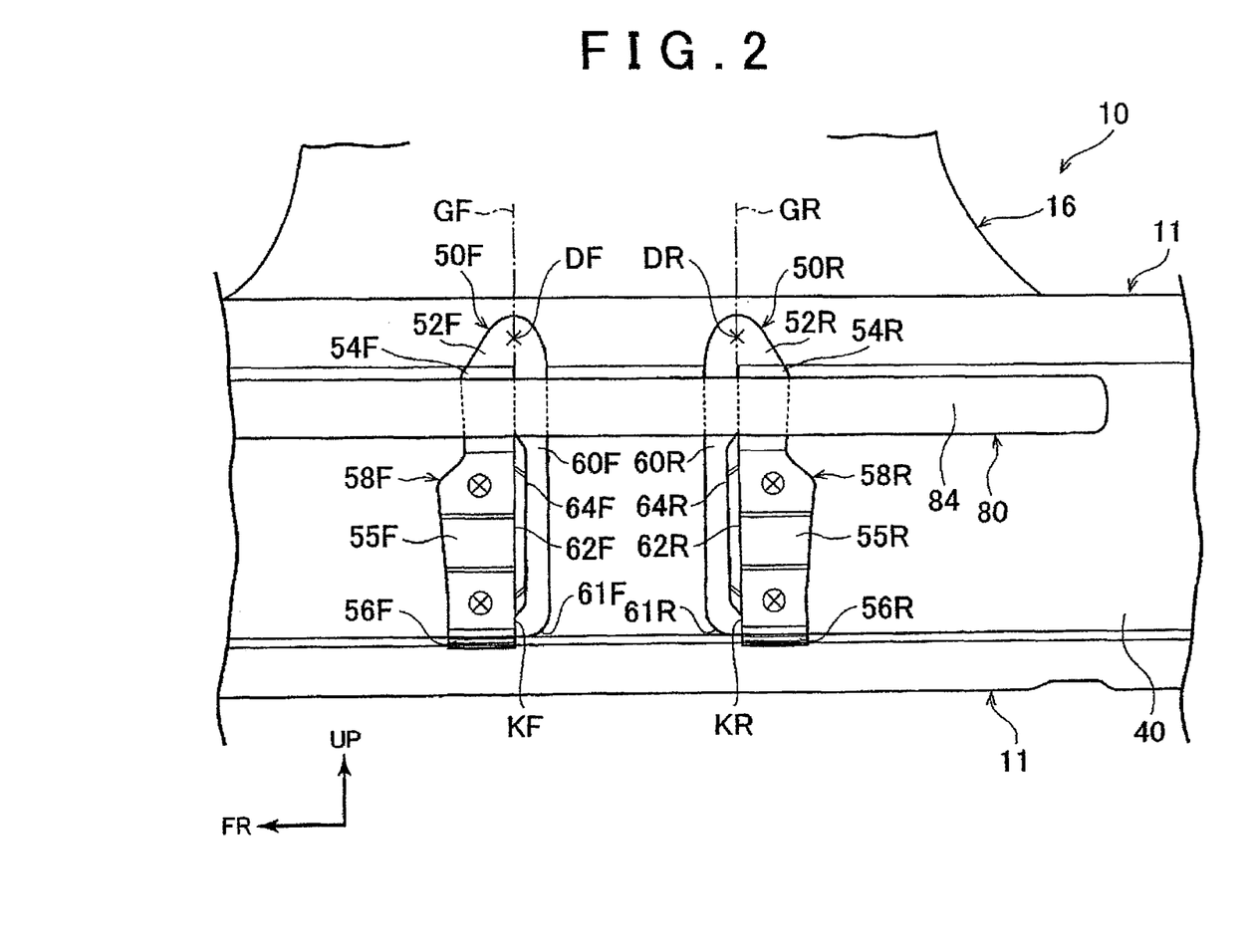
FIG. 2 is a side view, viewed from the outer side in the vehicle width direction, of the inside of a rocker in the vehicle side section to which the vehicle side section structure according to this embodiment is applied.

As illustrated in FIG. 1 and FIG. 2, in a coupled portion (the lower end portion of the center pillar 16) coupled with the center pillar 16 inside of the rocker 20, the bulkhead 50F and the bulkhead 50R are arranged to be spaced each other in the vehicle longitudinal direction. In this embodiment, as illustrated in FIG. 3, the bulkheads 50F and 50R are provided at the rocker inner panel 30 side inside of the rocker 20.

Figure 4:
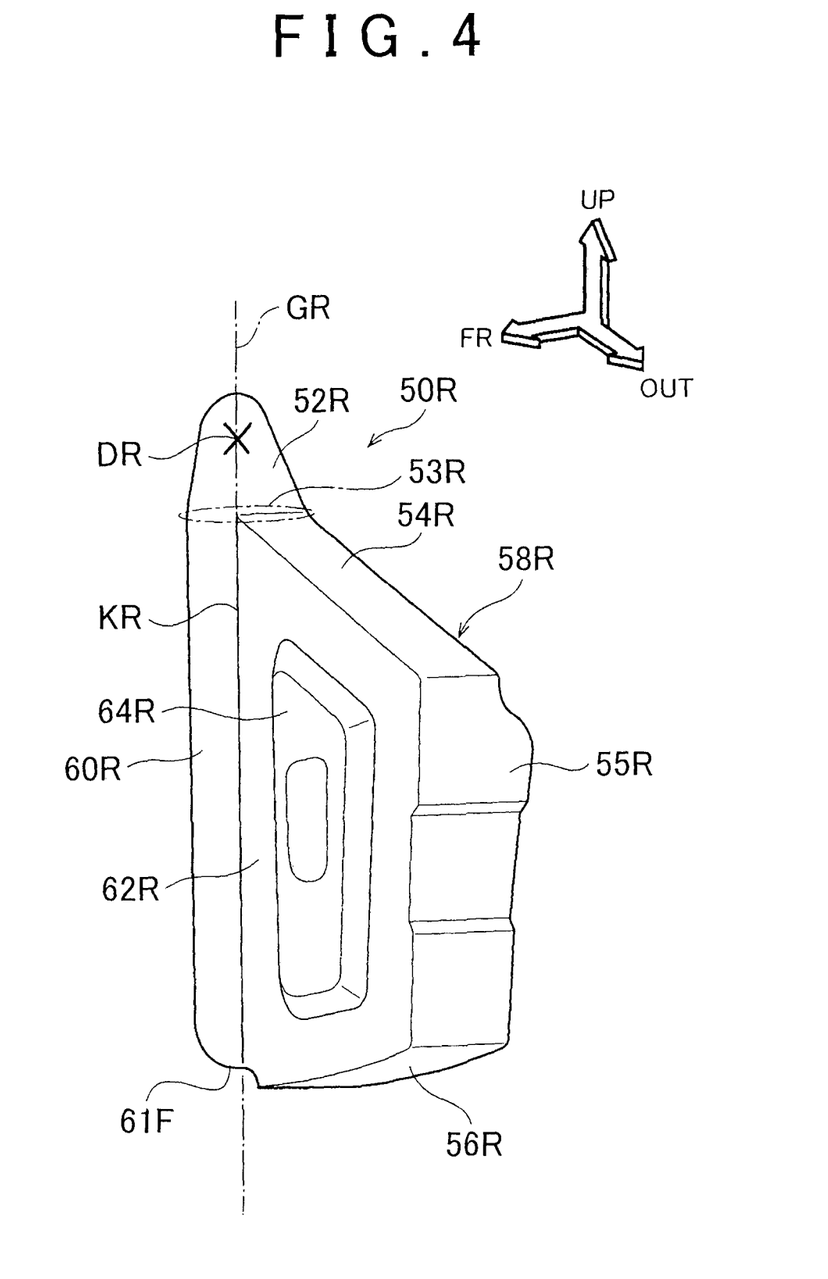
FIG. 4 is a perspective view illustrating a bulkhead at a vehicle rear side illustrated in FIG. 2.

The bulkhead 50F and the bulkhead 50R have mutually inverted configurations in the right-left direction (in the vehicle longitudinal direction) in FIG. 1 and FIG. 2, that is, bilaterally symmetrical, and otherwise similar to each other. In the case where F and R are necessary to be distinguished, one of F and R is added after the reference numeral in the description. In the case where F and R are not necessary to be distinguished, F and R may be omitted in the description. In FIG. 3 and FIG. 4, the bulkhead 50F is not illustrated. As described above, the bulkhead 50F is also bilaterally symmetrical, and otherwise similar to the bulkhead 50R.

As illustrated in FIG. 2 to FIG. 4, the bulkheads 50F and 50R include respective first flange portions 52F and 52R, respective second flange portions 60F and 60R, and respective third flange portions 58F and 58R. The third flange portions 58F includes an upper wall portion 54F, a sidewall portion 55F and a lower wall portion 56F. The third flange portions 58R includes an upper wall portion 54R, a sidewall portion 55R and a lower wall portion 56R.

As illustrated in FIG. 3, the first flange portion 52 is sandwiched between the upper flange portion 32 of the rocker inner panel 30 and the upper flange portion 42 of the rocker outer panel 40 as described above and fixed by spot welding.

As illustrated in FIG. 2 and FIG. 4, a second flange portion 60 downwardly extends from the first flange portion 52 approximately in the vertical direction, and has a lower end 61 that is disposed close to a joint portion (see FIG. 3) of the lower flange portions 38 and 48.

As illustrated in FIG. 3, the third flange portion 58R forms approximately a U-shaped cross section with the upper wall portion 54R, the sidewall portion 55R, and the lower wall portion 56R (see also FIG. 4). The third flange portion 58R extends from the first flange portion 52 to be at least partially in contact with an inner surface 30M of the rocker inner panel 30. An inner surface of the rocker outer panel 40 is represented by the reference 40M. In this embodiment, the upper wall portion 54R of the third flange portion 58R is disposed to have a gap between the upper wall portion 54R and the upper wall portion 34 of the rocker inner panel 30. This forms an additional closed cross section 21 inside of the closed cross section 22 of the rocker 20. The sidewall portion 55R of the third flange portion 58R is brought to mate with the sidewall portion 35 of the rocker inner panel 30. while the lower wall portion 56R is brought to mate with the lower wall portion 36 of the rocker inner panel 30. These mated portions are each fixed by spot welding.

As illustrated in FIG. 4, a longitudinal wall portion 62R intersects with the second flange portion 60R and the third flange portion 58R, and is provided in an area surrounded by the second flange portion 60R and the third flange portion 58R viewed in the vehicle longitudinal direction to have the vehicle longitudinal direction coincided with a thickness direction of the longitudinal wall portion 62R.

As illustrated in FIG. 2, a longitudinal wall portion 62F and longitudinal wall portion 62R are arranged to be spaced in the vehicle longitudinal direction and face each other. In the central portion of the longitudinal wall portion 62F, a protruding portion 64F, which is depressed at the vehicle front side and protrudes backward, is formed. Similarly, in the central portion of the longitudinal wall portion 62R, a protruding portion 64R, which is depressed at the vehicle rear side and protrudes forward, is formed (see also FIG. 3 and FIG. 4).

When viewed from another aspect, as illustrated in FIG. 3, the bulkheads 50F and 50R are disposed at the rocker inner panel 30 side of the closed cross section 22 inside of the rocker 20 such that the longitudinal wall portion 62F and the longitudinal wall portion 62R face each other. The bulkheads 50F and 50R are provided to partition the rocker inner panel 30 side of the closed cross section 22 inside of the rocker 20 (except a portion of the closed cross section 21) in the vehicle longitudinal direction (see FIG. 2).

As illustrated in FIG. 2, the second flange portion 60R of the bulkhead 50R at the vehicle rear side is extended from the longitudinal wall portion 62R toward the vehicle front side. The third flange portion 58 is extended from the longitudinal wall portion 62R toward the vehicle rear side (see also FIG. 4). Similarly, the second flange portion 60F of the bulkhead 50F at the vehicle front side is extended from the longitudinal wall portion 62F toward the vehicle rear side. The third flange portion 58 is extended from the longitudinal wall portion 62R toward the vehicle front side.

Then, the first flange portion 52 is extended from the second flange portion 60 and the third flange portion 58 toward the upper side. The first flange portion 52 is sandwiched and fixed between the upper flange portion 32 of the rocker inner panel 30 and the upper flange portion 42 of the rocker outer panel 40 as described above.

Welding points DF and DR of the spot welding at the first flange portions 52F and 52R are arranged at respective extended lines GF and GR (or at the proximity of the extended lines GF and GR) of edge lines KF and KR. The edge line KF is a corner portion formed by the second flange portion 60F and the longitudinal wall portion 62F, while the edge line KR is a corner portion formed by the second flange portion 60R and the longitudinal wall portion 62R (see also FIG. 4).

As illustrated in FIG. 3, inside of the closed cross section 21 formed by the upper wall portion 54 of the third flange portion 58 and the rocker inner panel 30 inside of the rocker 20, a reinforcing member 80, which extends in the vehicle longitudinal direction, is disposed as illustrated in FIG. 1 and FIG. 2. That is, one long reinforcing member 80 is provided inside of the rocker 20 so as to overlap the bulkheads 50F and 50R in the side view such that the vehicle longitudinal direction coincides with the longitudinal direction.

As illustrated in FIG. 3, the reinforcing member 80 is constituted of an upper portion 82 and a side portion 84 so as to have approximately an L-shaped cross section. Then, the upper portion 82 of the reinforcing member 80 is fixed to the upper wall portion 34 of the rocker inner panel 30. The side portion 84 is disposed to face the sidewall portion 35 of the rocker inner panel 30.

(Operations and effects) Next, operations and effects of this embodiment will be described.

Figure 5A:
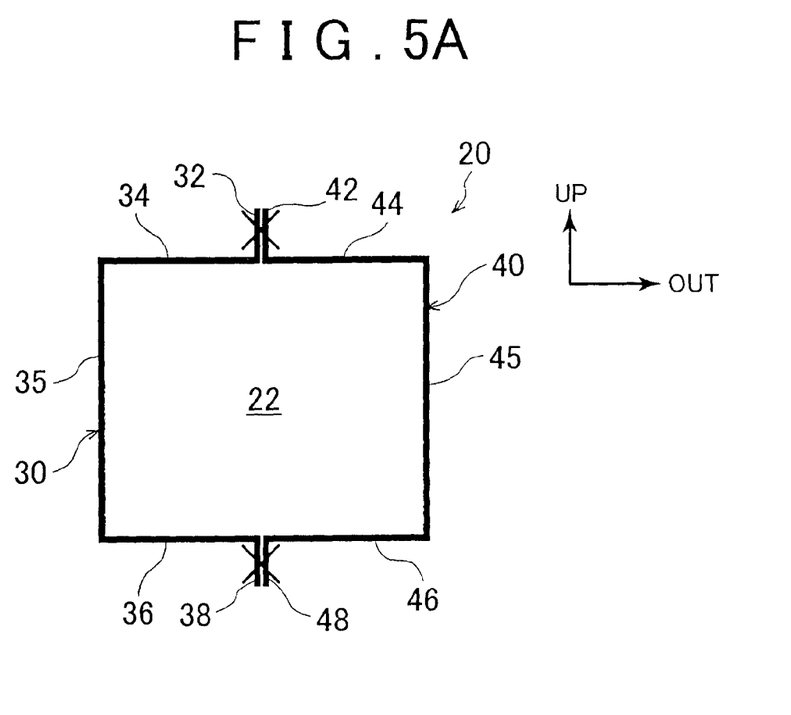
FIG. 5A illustrates a state before the deformation.
Figure 5B:
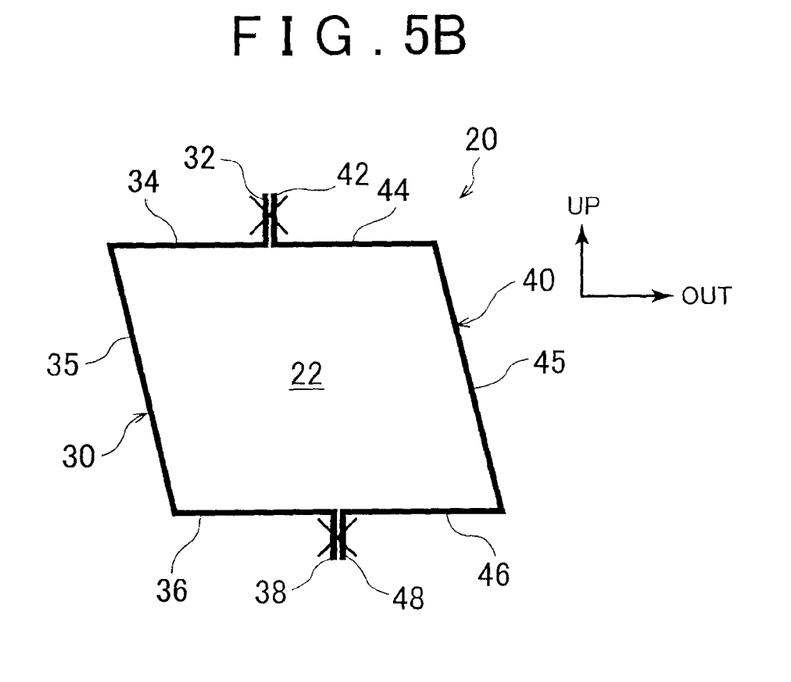
FIG. 5B illustrates a state after the deformation into the parallelogram shape.

A load input to the vehicle upper side with respect to the rocker 20 from the outer side in the vehicle width direction to the inner side, which is a load input to the center pillar 16 from the outer side in the vehicle width direction in this embodiment, deforms the closed cross section 22 of the rocker 20 (which causes a sectional collapse in the closed cross section 22). Specifically, as illustrated in FIG. 5A, in the case where a cross-sectional shape of the closed cross section 22 is approximated to a rectangular shape (in the case where the cross-sectional shape is assumed to be a rectangular shape), the sidewall portion 35 and the sidewall portion 45, which are approximately vertical, are inclined as illustrated in FIG. 5B. This deforms the closed cross section 22 into a parallelogram shape.

However, the bulkhead 50 is disposed inside of the closed cross section 22 of the rocker 20. This suppresses the deformation of the closed cross section 22 of the rocker 20 into the parallelogram shape as illustrated in FIGS. 5A and 5B (which suppresses a sectional collapse of the closed cross section 22).

Specifically, the third flange portion 58 of the bulkhead 50 is fixed to the inner surface 30M of the rocker inner panel 30, and the first flange portion 52 is sandwiched and fixed between the upper flange portion 32 and the upper flange portion 42. This suppresses the rotation of the bulkhead 50 around the vehicle longitudinal direction as the axial direction. As a result, this effectively suppresses the deformation of the closed cross section 22 of the rocker 20 into a parallelogram shape.

The second flange portion 60 and the third flange portion 58 are coupled to the first flange portion 52. These three members are integrally constituted to reduce stress concentration on a base portion 53 (see FIG. 3) of the first flange portion 52. At the extended line G (or at the proximity of the extended line G) of the edge line K in the corner portion, which is formed of the second flange portion 60 and the longitudinal wall portion 62, (which is formed between the second flange portion 60 and the longitudinal wall portion 62), the first flange portion 52 is spot welded (the welding point is located at the extended line G (or its proximity)). Thus, the stress concentration on the base portion 53 of the first flange portion 52 is effectively reduced. Accordingly, this prevents breaking of the first flange portion 52 and similar trouble due to the stress concentrated on the base portion 53 of the first flange portion 52. This effectively suppresses the deformation of the closed cross section 22 of the rocker 20 into a parallelogram shape.

Even in the case where the reinforcing member 80 passes through the cross section where the bulkhead 50 is disposed, the reinforcing member 80 disposed inside of the closed cross section 22 can easily avoid splitting the reinforcing member in front and rear of the bulkhead. According to this embodiment, the one long reinforcing member 80 is disposed inside of the rocker 20 so as to overlap the bulkheads 50F and 50R in the side view such that the vehicle longitudinal direction coincides with the longitudinal direction. Thus, both of the bulkheads 50F and 50R and the reinforcing member 80 reinforces the rocker 20, and the rocker 20 is more strongly reinforced than a configuration where reinforcing members are divided in front and rear of the bulkheads 50F and 50R.

(Modification) Next, a modification of this embodiment will be described by referring to FIG. 6.

Figure 6:
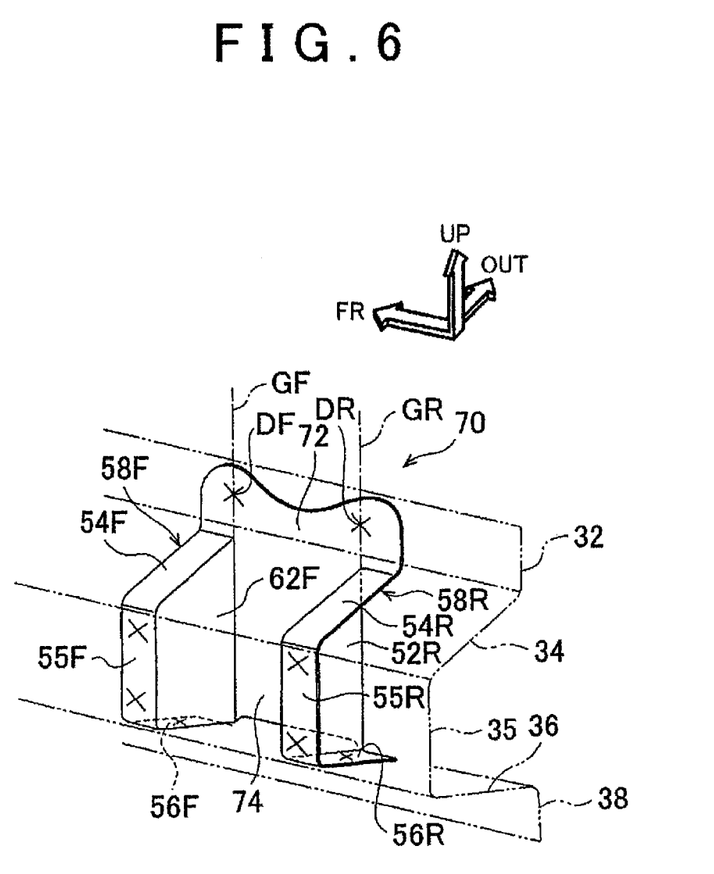
FIG. 6 is a perspective view schematically illustrating a bulkhead according to a modification.

As illustrated in FIG. 6, a bulkhead 70 according to the modification includes a first flange portion 72, in which the first flange portions 52F and 52R of the bulkheads 50F and 50R illustrated in FIG. 2 are coupled one another and integrated, and a second flange portion 74, in which the second flange portions 60F and 60R illustrated in FIG. 2 are coupled one another and integrated. That is, the bulkhead 50F and the bulkhead 50R are integrated. Then, the first flange portion 72 that is sandwiched between the upper flange portion 32 of the rocker inner panel 30 and the upper flange portion 42 of the rocker outer panel 40 is spot welded (see FIG. 3). The two third flange portions 58F and 58R are spaced in the vehicle longitudinal direction. In the bulkhead 70 illustrated in FIG. 6, the bulkhead 70 may be formed of a single member.

Also in this modification, the welding points DF and DR of the spot welding at the first flange portion 72 are arranged at the respective extended lines GF and GR (or at the proximity of the extended lines GF and GR) of the edge lines KF and KR at the corner portions. The corner portions are formed of the second flange portion 74 and the respective longitudinal wall portions 62F and 62R.

Thus, the bulkhead 70, in which the bulkhead 50F and the bulkhead 50R are integrated or the bulkhead 70 is formed of a single member, ensures improved rigidity compared with a configuration where these two members are not integrated, and effectively suppresses the rotation of the bulkhead 70 around the vehicle longitudinal direction as the axial direction. Accordingly, the deformation of the closed cross section 22 of the rocker 20 into a parallelogram shape is further effectively suppressed.

(Others) The present invention is not limited to the above-described embodiment.

For example, while in the above-described embodiment and modification, the bulkheads 50F and 50R and the bulkhead 70 are provided at the rocker inner panel 30 side inside of the rocker 20, this should not be construed in a limiting sense. The bulkhead may be provided at the rocker outer panel 40 side inside of the rocker 20, or may be provided at both of the rocker inner panel 30 side and the rocker outer panel 40 side. Additionally, the bulkhead may be disposed across the rocker inner panel 30 side and the rocker outer panel 40 side.

A lower first flange portion that extends to the lower side may be disposed at the bulkhead to sandwich the lower first flange portion between the lower flange portion 38 of the rocker inner panel 30 and the lower flange portion 48 of the rocker outer panel 40 and fix these members together.

While in the above-described embodiment, the two bulkheads 50 are disposed inside of the rocker 20 to face one another in the vehicle longitudinal direction, this should not be construed in a limiting sense. Only one bulkhead 50 may be disposed. Alternatively, three or more bulkheads 50 may be disposed. A plurality of bulkheads 70 of the above-described modification may be disposed inside of the rocker 20. Additionally, both of the bulkhead 50 and the bulkhead 70 may be disposed inside of the rocker 20.

Any configuration is possible insofar as the third flange portion extends such that at least a part of the third flange portion is in contact with the inner surface of the rocker inner panel or the inner surface of the rocker outer panel. Any configuration is possible insofar at least one fixing point is disposed between the third flange portion and the inner surface of the rocker inner panel or between the third flange portion and the inner surface of the rocker outer panel.

Additionally, it is obvious that various embodiments are possible without departing from the scope of the invention.

The invention claimed is:

1. A vehicle side section structure comprising:
   a rocker that includes a rocker outer panel and a rocker inner panel, the rocker outer panel and the rocker inner panel each having a hat-shaped cross section, the rocker forming a first closed cross section with an opening of the rocker outer panel and an opening of the rocker inner panel facing one another, the first closed cross section being formed by fixing an upper flange portion of the rocker outer panel and an upper flange portion of the rocker inner panel together and by fixing a lower flange portion of the rocker outer panel and a lower flange portion of the rocker inner panel together, and the rocker extending in a vehicle longitudinal direction along a lower edge portion of a vehicle side section; and
   a bulkhead disposed inside of the rocker, the bulkhead being provided to correspond to a portion coupling a center pillar with the rocker, the bulkhead including a first flange portion, a second flange portion, and a third flange portion, the first flange portion being sandwiched between the upper flange portion of the rocker inner panel and the upper flange portion of the rocker outer panel and fixed to the upper flange portion of the rocker inner panel and the upper flange portion of the rocker outer panel, the second flange portion downwardly extending from the first flange portion, and the third flange portion extending from the first flange portion, wherein
   the second flange portion and the third flange portion are coupled to the first flange portion,
   the third flange portion includes an upper wall portion, a sidewall portion and a lower wall portion,
   the sidewall portion contacts with an inner surface of the rocker inner panel or an inner surface of the rocker outer panel,
   the sidewall portion is fixed to the inner surface of the rocker inner panel or the inner surface of the rocker outer panel,
   the bulkhead includes a longitudinal wall portion that extends in a direction to intersect with the second flange portion and the third flange portion,
   the longitudinal wall portion is disposed such that the vehicle longitudinal direction coincides with a thickness direction of the longitudinal wall portion,
   an edge line in a corner portion formed between the second flange portion and the longitudinal wall portion extends from a lower end of the bulkhead, and
   the first flange portion is welded to the upper flange portion of the rocker inner panel and the upper flange portion of the rocker outer panel at an extended line of the edge line or at a proximity of the extended line.

2. The vehicle side section structure according to claim 1, wherein
   the upper wall portion of the third flange portion is disposed to form a second closed cross section with a gap between the upper wall portion of the third flange portion and an upper wall portion of the rocker inner panel,
   a reinforcing member that extends in the vehicle longitudinal direction is disposed inside of the second closed cross section, and
   the second closed cross section is formed by the upper wall portion of the third flange portion and the rocker inner panel.

3. The vehicle side section structure according to claim 1, wherein
   the bulkhead includes a pair of bulkheads,
   the bulkheads are spaced in the vehicle longitudinal direction inside of the rocker, and
   the bulkheads include the first flange portions coupled and integrated with one another and the second flange portions coupled and integrated with one another.

4. The vehicle side section structure according to claim 1, wherein the edge line extends linearly.

5. The vehicle side section structure according to claim 4, wherein the edge line extends upward.

6. The vehicle side section structure according to claim 1, wherein the first flange portion is welded to the upper flange portion of the rocker inner panel and the upper flange portion of the rocker outer panel at the extended line.

7. A vehicle side section structure comprising:
   a rocker that includes a rocker outer panel and a rocker inner panel, the rocker outer panel and the rocker inner panel each having a hat-shaped cross section, the rocker forming a closed cross section with an opening of the rocker outer panel and an opening of the rocker inner panel facing one another, the closed cross section being formed by fixing an upper flange portion of the rocker outer panel and an upper flange portion of the rocker inner panel together and by fixing a lower flange portion of the rocker outer panel and a lower flange portion of the rocker inner panel together, and the rocker extending in a vehicle longitudinal direction along a lower edge portion of a vehicle side section; and
   a bulkhead disposed inside of the rocker, the bulkhead being provided to correspond to a portion coupling a center pillar with the rocker, the bulkhead including a first flange portion, a second flange portion, and two third flange portions, the first flange portion being sandwiched between the upper flange portion of the rocker inner panel and the upper flange portion of the rocker outer panel and fixed to the upper flange portion of the rocker inner panel and the upper flange portion of the rocker outer panel, the second flange portion downwardly extending from the first flange portion, the two third flange portions being spaced in the vehicle longitudinal direction, and the two third flange portions extending from the first flange portion, wherein
   each of the two third flange portions includes an upper wall portion, a sidewall portion and a lower wall portion,
   the sidewall portion contacts with an inner surface of the rocker inner panel or an inner surface of the rocker outer panel,
   the sidewall portion is fixed to the inner surface of the rocker inner panel or the inner surface of the rocker outer panel,
   the bulkhead includes two longitudinal wall portions that extend in a direction to intersect with the second flange portion and the two third flange portions,
   thickness directions of the two longitudinal wall portions each coincide with the vehicle longitudinal direction,
   an edge line in a corner portion formed between the second flange portion and each of the longitudinal wall portions extends from a lower end of the bulkhead, and
   the first flange portion is welded to the upper flange portion of the rocker inner panel and the upper flange portion of the rocker outer panel at an extended line of the edge line or at a proximity of the extended line.

8. The vehicle side section structure according to claim 7, wherein the edge line extends linearly.

9. The vehicle side section structure according to claim 8, wherein the edge line extends upward.

10. The vehicle side section structure according to claim 7, wherein the first flange portion is welded to the upper flange portion of the rocker inner panel and the upper flange portion of the rocker outer panel at the extended line.

\* \* \* \* \*